US005818693A

United States Patent [19]
Garner et al.

[11] Patent Number: 5,818,693
[45] Date of Patent: Oct. 6, 1998

[54] HEAT DISSIPATING COMPUTER CASE HAVING ORIENTED FIBERS AND HEAT PIPE

[75] Inventors: Scott D. Garner, Lititz; Jerome E. Toth, Hatboro, both of Pa.

[73] Assignee: Thermal Corp., Georgetown, Del.

[21] Appl. No.: 780,858

[22] Filed: Jan. 9, 1997

[51] Int. Cl.⁶ ..................................................... H05K 7/20
[52] U.S. Cl. .................. 361/700; 165/104.33; 174/15.2; 361/687
[58] Field of Search ..................................... 428/408, 913; 364/708.1; 174/16.3, 15.2, 35 RMS; 165/80.3, 185, 104.21, 104.33; 361/687, 690, 699, 700, 704, 705, 707–713, 717–720, 816, 818

[56] References Cited

U.S. PATENT DOCUMENTS

| | | | |
|---|---|---|---|
| 4,204,246 | 5/1980 | Arii et al. ................................. | 361/385 |
| 4,449,578 | 5/1984 | Munekawa .......................... | 165/104.33 |
| 4,471,837 | 9/1984 | Larson .................................... | 165/185 |
| 4,781,175 | 11/1988 | McGreevy et al. ................. | 128/303.17 |
| 4,849,858 | 7/1989 | Grapes et al. ........................... | 361/708 |
| 4,995,451 | 2/1991 | Hamburgen .............................. | 361/700 |
| 4,998,933 | 3/1991 | Eggers et al. ............................. | 606/41 |
| 5,077,637 | 12/1991 | Martorana ................................ | 361/717 |
| 5,089,002 | 2/1992 | Kirwan, Jr. ............................... | 606/50 |
| 5,095,404 | 3/1992 | Chao ....................................... | 361/385 |
| 5,178,620 | 1/1993 | Eggers et al. ............................. | 606/41 |
| 5,287,248 | 2/1994 | Montesano .............................. | 361/708 |
| 5,312,401 | 5/1994 | Newton et al. .......................... | 606/46 |
| 5,339,214 | 8/1994 | Nelson .................................... | 361/695 |
| 5,366,443 | 11/1994 | Eggers et al. ........................... | 604/114 |
| 5,383,340 | 1/1995 | Larson et al. ........................... | 361/700 |
| 5,390,734 | 2/1995 | Voorhes .................................. | 361/704 |
| 5,404,272 | 4/1995 | Lebailly et al. ........................ | 361/700 |
| 5,419,767 | 5/1995 | Eggers et al. ........................... | 604/114 |
| 5,513,070 | 4/1996 | Xie et al. ................................ | 361/700 |
| 5,708,297 | 1/1998 | Clayton .................................... | 257/23 |

*Primary Examiner*—Gerald P. Tolin
*Attorney, Agent, or Firm*—Martin Fruitman

[57] ABSTRACT

The apparatus is a cooling structure for laptop computers, in which the heat is transferred to a heat pipe in the cover of the case behind the display screen. The heat pipe behind the screen is interconnected with the external wall of the cover by a holding fixture which, preferably, is integrated into the cover wall during manufacture. The cover is specially constructed with high thermal conductivity carbon fibers which are oriented to preferentially conduct heat from the heat pipe to the cover and to spread the heat over the entire external surface of the cover for dissipation into the environment.

6 Claims, 2 Drawing Sheets

HEAT DISSIPATING COMPUTER CASE HAVING ORIENTED FIBERS AND HEAT PIPE

BACKGROUND OF THE INVENTION

This invention deals generally with housings and mounting assemblies for electrical systems and devices, and more specifically with a heat dissipating case for a laptop computer.

With the advent of portable, battery operated, personal computers the cooling of integrated circuit chips has become both more critical and more difficult. Desk top computers which are connected to electrical power lines have comparatively unlimited space and power to locate and operate fans for cooling, and they also do not have severe weight restrictions.

Portable computers, the so called laptop computers, are, however, very restricted in space, power, and weight, and such restrictions create significant problems in cooling the critical integrated circuits and disposing of the generated heat. At the same time, the number of functions and the power dissipated by individual integrated circuits has significantly increased, so that the quantity of heat to be removed has also increased.

Numerous patents have addressed these problems, but most of the devices are very complex and difficult to manufacture so that there are significant possibilities for improvement. Some of the prior art devices use heat sinks which are massive parts and which are impractical to use in a laptop computer. Others make the effort to move the heat away from a heat sink which is adjacent to the integrated circuit chip, but attempt to dissipate the heat in nearby metal components within the base, the keyboard section, of the laptop. However, with the high powers of the integrated circuits and the high density of auxiliary heat dissipating components such as CD-ROMs, modems, and power supplies now prevalent in computers, the heat load is approaching the limit of what can be dissipated by natural convection from the surface area of the base of the computer, and heat which is not removed from the region near the integrated circuit can build up and can lead to high temperatures and damage to the integrated circuit chip.

SUMMARY OF THE INVENTION

The present invention overcomes this problem by using the cover of the laptop computer, the display screen section, to dissipate the heat generated by integrated circuits within the keyboard section. The screen section of a laptop is particularly suited for the disposal of heat because the case behind the screen has few heat generating components, a large surface area for transferring heat to the environment, and, when in use, the back surface is nearly vertical so that natural convection air currents are easily established.

However, for the cover to act as a heat dissipator it must be constructed of a material with reasonably good heat conduction in the plane parallel to the display screen, and there must be a satisfactory heat transmission path from the keyboard section to the ambient air around the cover section. While metals are, of course, generally used as heat conductive materials, they are generally not satisfactory for laptop computer covers because of their weight and the cost of assembling metal surfaces into the molded plastic cases of laptops. Other materials, such as specially formulated plastics or carbon fibers in a carbon impregnated structure, can, however, be used for heat conduction, and the present invention overcomes the problems associated with the use of such materials in conjunction with a laptop computer.

The transfer of heat to the cover section of the laptop is accomplished by use of heat pipes within the base section and a thermally conductive hinge so that there is only a small temperature difference between the integrated circuit heat sink and the location at which the heat enters the cover. The present invention assures that the heat is also moved from the thermal hinge to the ambient air with minimal temperature difference.

The invention is a heat conductive molded cover section for a laptop computer with an integral heat pipe mounting fixture. The top surface of the cover, the surface behind the screen, is formed of a moldable plastic which has thermally conductive carbon fibers molded into it. The fibers are parallel to each other and are oriented so that they run horizontally across the back of the cover when the cover is open for use. At one location along the path of the carbon fibers a holding fixture for attaching a heat pipe is formed. The preferred embodiment of this fixture is a long cylindrical hole dimensioned to fit around an inserted heat pipe. A suitable location for such a hole is within a web section molded into the corner of the cover where the top surface and one edge meet. The cylindrical hole runs parallel to the corner. A heat pipe is inserted into the holding fixture by sliding it in from one end of the hole. This same heat pipe can be extended to make contact with the thermal hinge.

Alternate embodiments of the holding fixture include various configurations of holding fixtures in locations similar to those in which the hole would be placed. Such fixtures can be clips which are essentially long holes, but each includes a slot which runs the entire length of the hole, so that a heat pipe can be aligned with the slot and pushed into the hole as the sides of the slot deflect slightly.

Since the holding fixture is molded right into the structure of the carbon fiber impregnated case, the heat conducting carbon fibers are held in intimate contact with a heat pipe inserted into the holding fixture, and heat is easily conducted from the heat pipe to the carbon fibers. The fibers then conduct the heat throughout the entire top surface of the cover, and this considerable surface area acts as a convection surface to transfer the heat to the ambient air.

The heat of the components within the base section of the laptop computer is thereby moved to and disposed of from the one surface which until now has not been fully utilized, and that surface is still constructed of economical and desirable plastic as opposed to more costly metal.

DETAILED DESCRIPTION OF THE INVENTION

Figure 1:
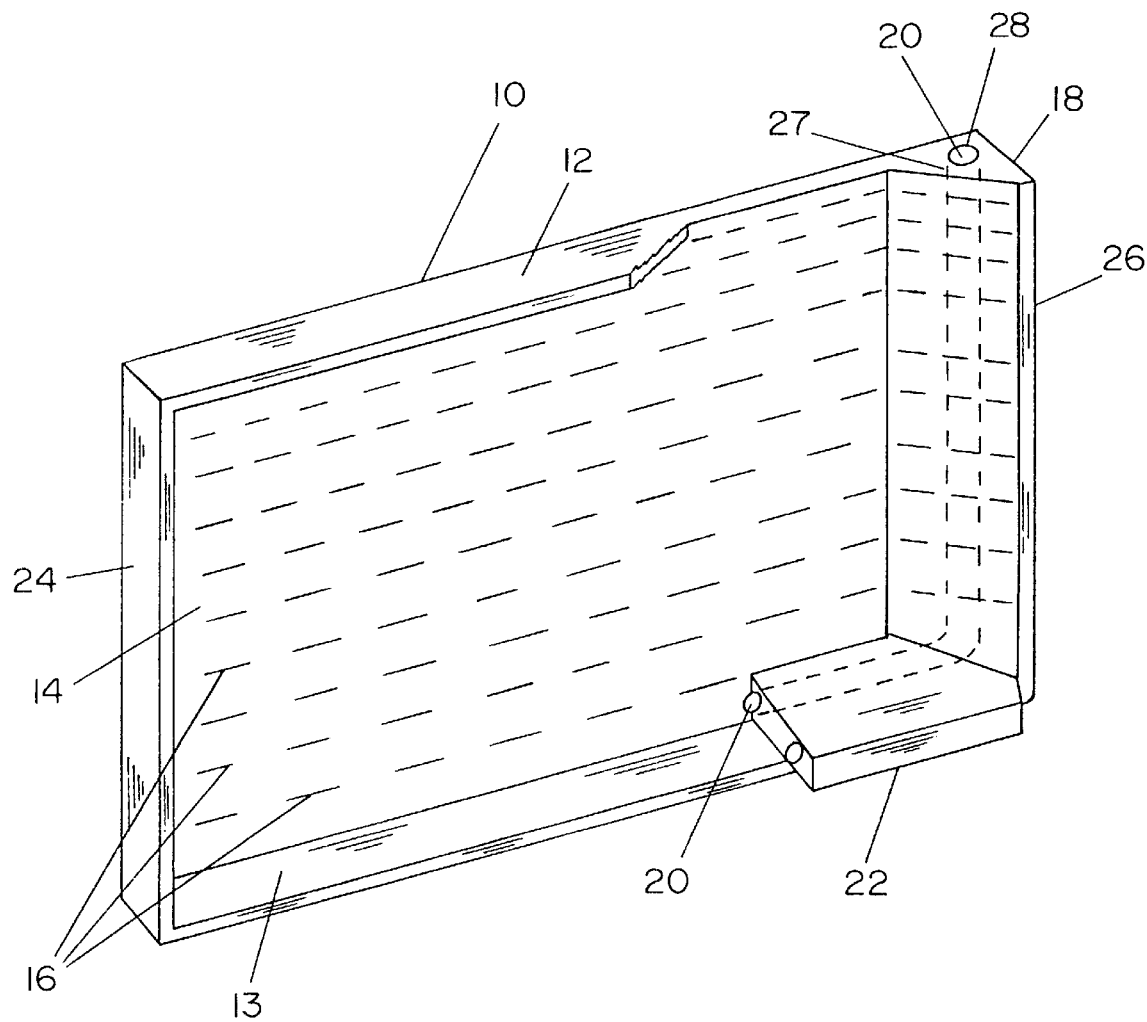
FIG. 1 is a perspective view of the cover of a laptop computer with the display screen and a small portion of one edge wall removed for better viewing of the preferred embodiment of the invention.

FIG. 1 is a perspective view of cover 10 of a typical laptop computer (balance not shown) with the display screen and a small portion of one long edge wall 12 removed for better viewing of the interior of cover 10.

In order to endow the typical plastic used for laptop computer covers with heat conductive characteristics, at least large wall 14, which is behind the display screen (not shown) when the laptop is assembled, is formed of high thermal conductivity carbon fibers 16 within wall 14 with carbon fibers 16 oriented parallel to long edge wall 12. Thus, when cover 10 is open, wall 14 is oriented as shown in essentially a vertical plane, and carbon fibers 16 are generally horizontal.

In order to transfer heat to carbon fibers 16, heat pipe holding fixture 18 is integrated into cover 10, preferably by molding it into cover 10 when cover 10 is manufactured. The essential characteristic of holding fixture 18 is that it holds heat pipe 20 in good thermal contact so that at least a portion of the surface of heat pipe 20, along as much of its length as is practical, is located within heat conductive wall 14 and in contact with embedded carbon fibers 16. With that configuration, heat pipe 20 receives heat from thermal hinge 22 (not shown in its entirety) and transfers the heat to carbon fibers 16 which distribute the heat over the entire surface of heat conductive wall 14, from which it is transferred to the ambient air by natural convection.

The preferred location of holding fixture 18 is at the junction of heat dissipating wall 14 and one of the edge walls, 12, 13, 24, or 26, simply because there is usually more space there, since the display screen does not extend to the very edges of the cover. It is therefore possible to construct holding fixture 18 with greater volume in that location, and the greater volume aids in heat transfer to carbon fibers 16.

In the preferred embodiment shown in FIG. 1, holding fixture 18 is constructed as web 27 filling in the corner between heat dissipating wall 14 and edge wall 26. Web 27 includes hole 28 into which heat pipe 20 is mounted, and at least a portion of hole 28 is intersected by a part of cover 10 which includes carbon fibers 16 so that thermal contact is established between heat pipe 20 and fibers 16. It can easily be appreciated that, although it is not vital for the function of the invention, it improves heat transfer to and from cover 10 somewhat and is much easier to construct if all of cover 10, including web 27, is formed with embedded carbon fibers.

Figure 2:
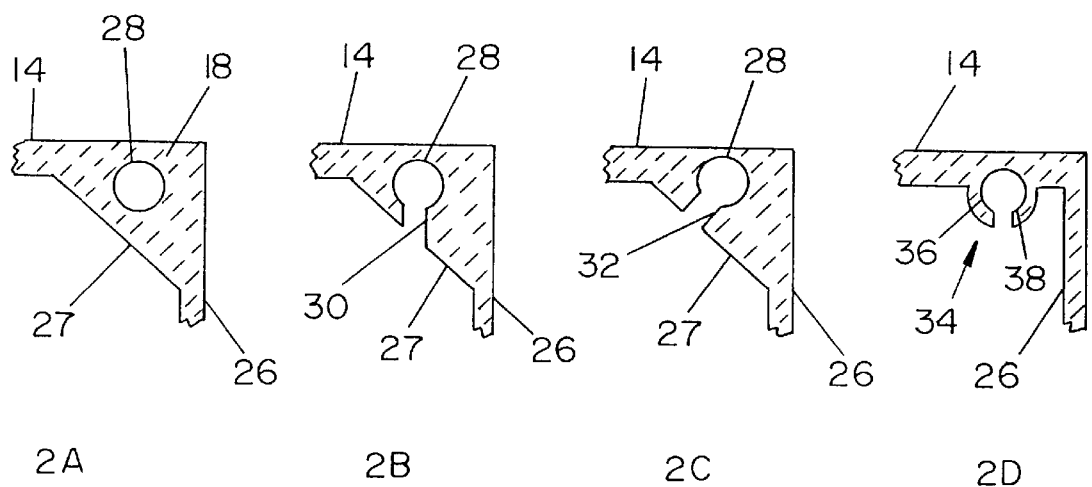
FIGS. 2A–2D are a series of cross section views across the heat pipe holding fixture for alternate embodiments of the holding fixture of the invention.

FIGS. 2A–2D are a series of cross section views across the length of the heat pipe holding fixture which depict alternate embodiments of the holding fixture. FIG. 2A is a cross section of the preferred embodiment shown in FIG. 1 with hole 28 located partly within wall 14 and partly within web 27. Hole 28 is dimensioned so that the heat pipe used fits tightly within it to provide a junction across which heat is transferred with minimum temperature differential. The carbon fibers within wall 14 are essentially oriented perpendicular to the length of hole 28 and at least some of the fibers are adjacent to hole 28.

FIGS. 2B and 2C are alternate embodiments of FIG. 2A in which slots 30 and 32 are added to provide a means by which a heat pipe can more easily be inserted into hole 28 by deflecting the edges of the slot as the heat pipe is inserted.

FIG. 2D shows a somewhat different holding fixture 34 in which curved opposed surfaces 36 and 38 are shaped to deflect and to fit around a heat pipe which can be inserted into position between deflecting surfaces 36 and 38, so that the surfaces separate slightly and maintain compression on the heat pipe. Holding fixture 34 has an advantage in that it does not require a corner structure such as web 27, and can therefore be positioned at any location along wall 14 which may be required by the location of other components.

The present invention thereby provides an apparatus for easily disposing of additional heat from a laptop computer by approximately doubling the surface available for natural convection cooling of the laptop while still retaining the preferable non-metallic case structure. Furthermore, the fibers embedded within cover 14 can be of material other than carbon, for instance metal fibers, and can be electrically conductive as well as thermally conductive, so they aid in shielding the laptop computer from Electro-Magnetic Interference.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, heat pipe 20 can be located along a long edge wall 12 or 13 of cover 10 and carbon fibers 16 would therefore be oriented parallel to shorter edge walls 24 and 26.

What is claimed as new and for which Letters Patent of the United States are desired to be secured is:

1. A heat dissipating computer case comprising:
   at least one heat conducting external wall of a computer case constructed of a plastic material with heat conducting fibers embedded within the plastic material, with the fibers oriented so that they conduct heat from a holding fixture to a surface of the wall which is exposed to ambient air;
   the holding fixture attached to the inside surface of the external computer case wall which has embedded heat conducting fibers; and
   a heat pipe held in the holding fixture in thermal contact with the heat conducting fibers in the wall to which the holding fixture is attached.

2. The computer case of claim 1 wherein the holding fixture comprises a structure on the inside of the external wall with the structure adjacent to an inside corner of the computer case and including a hole into which the heat pipe is inserted, with the hole oriented parallel to the inside corner of the case.

3. The computer case of claim 1 wherein the external wall is located in a part of the computer case within which a display screen is located, and the heat pipe receives heat from a part of the computer case other than the part with the display screen.

4. The computer case of claim 1 wherein the holding fixture comprises a structure on the inside of an external wall of the computer case with the structure including a hole into which the heat pipe is inserted, and the hole in the holding fixture includes a slot along its entire length to facilitate insertion of the heat pipe into the hole.

5. The computer case of claim 1 wherein the holding fixture comprises two deflectable opposed curved surfaces which maintain compression upon a heat pipe installed between the curved surfaces.

6. The computer case of claim 1 wherein the holding fixture is attached to the wall by being formed integral with the wall as the wall is being manufactured.

* * * * *